US012783267B2

(12) United States Patent
Cho et al.

(10) Patent No.: US 12,783,267 B2
(45) Date of Patent: Nov. 3, 2026

(54) SYSTEM FOR MANAGING MULTI-SERVICE FOR SMART NAVIGATION AIDS BASED ON MICROSERVICE ARCHITECTURE

(71) Applicant: Korea Electronics Technology Institute, Seongnam-si (KR)

(72) Inventors: In Pyo Cho, Yongin-si (KR); Sang Yub Lee, Yongin-si (KR); Jaekyu Lee, Yongin-si (KR); Ki Won Kwon, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 457 days.

(21) Appl. No.: 18/462,721

(22) Filed: Sep. 7, 2023

(65) Prior Publication Data

US 2024/0103892 A1 Mar. 28, 2024

(30) Foreign Application Priority Data

Sep. 28, 2022 (KR) ........................ 10-2022-0123784

(51) Int. Cl.
*G06F 9/455* (2018.01)
*G06F 9/451* (2018.01)
*G06F 11/34* (2006.01)

(52) U.S. Cl.
CPC .......... *G06F 9/453* (2018.02); *G06F 11/3495* (2013.01)

(58) Field of Classification Search
USPC .......................................................... 719/319
See application file for complete search history.

(56) References Cited

U.S. PATENT DOCUMENTS

| | | | | |
|---|---|---|---|---|
| 2013/0167159 | A1* | 6/2013 | Ricci | G06F 21/10 719/319 |
| 2021/0356279 | A1* | 11/2021 | Szigeti | G01C 21/3407 |
| 2023/0206755 | A1* | 6/2023 | Jha | G08G 1/005 340/425.5 |
| 2024/0361137 | A1* | 10/2024 | Aviv | G01C 21/3469 |

FOREIGN PATENT DOCUMENTS

| | | |
|---|---|---|
| KR | 10-1118147 B1 | 2/2012 |
| KR | 10-2022-0056016 A | 5/2022 |

OTHER PUBLICATIONS

Paschalis Mpeis et al. "The Anyplace 4.0 IoT Localization Architecture", 2020 (Year: 2020).*

(Continued)

*Primary Examiner* — Pierre Vital
*Assistant Examiner* — Abdou K Seye
(74) *Attorney, Agent, or Firm* — Knobbe, Martens, Olson & Bear, LLP

(57) ABSTRACT

Proposed is a system for managing a multi-service for smart navigation aids based on microservice architecture. The system may include a smart navigation aid integrated platform, and a main operating system (OS) that operates on the smart navigation aid integrated platform. The system may also include a lightweight virtual OS manager based on a docker engine, which operates on the main OS, a plurality of lightweight virtual OSs that operate on a container basis by the lightweight virtual OS manager. The system may further include service applications that operate to correspond to the plurality of lightweight virtual OSs, respectively.

12 Claims, 8 Drawing Sheets

(56) References Cited

OTHER PUBLICATIONS

Roberto Morabito et al. “Consolidate IoT Edge Computing with Lightweight Virtualization” (Year: 2018).*
Notice of Allowance received in Korean Application No. 10-2022-0123784 dated on Jul. 30, 2025.
Cho et al., “Para-virtualized Multi-OS Management Technology for Stable Operation of Smart Navigational Aid Integrated Platform,” Proceedings of the Korean Institute of Navigation and Prot Research Conference, Nov. 19, 2021, pp. 23-24.
Cho et al., “Microservices Architecture for Smart Navigation Aids Integration Platform”, KETI, 2022 Joint Conference of the Korea Association of Ocean Science and Technology Societies, Jun. 4, 2022, 3 pages.
Office Action in Korean Patent Application No. 10-2022-0123784 dated Oct. 30, 2024.

* cited by examiner

SYSTEM FOR MANAGING MULTI-SERVICE FOR SMART NAVIGATION AIDS BASED ON MICROSERVICE ARCHITECTURE

CROSS-REFERENCE TO RELATED APPLICATION

This application claims priority to and the benefit of Korean Patent Application No. 10-2022-0123784 field on Sep. 28, 2022, the disclosure of which is incorporated herein by reference in its entirety.

BACKGROUND

Technical Field

The present disclosure relates to a microservice architecture-based system for effectively managing multiple services within smart navigation aids.

Description of the Related Technology

Navigation aids are means, such as lamp light, a shape, a color, a sound, and radio waves, and mean facilities, such as a lighthouse, a beacon, a light beacon or pharos, a fog signal station, or a racon, and a DGPS which operate as aids for vessels that navigate a port, a bay, a strait, other inland waters, territorial waters, and an exclusive border area. Recently, there are increasing attempts to operate the navigation aids as smart navigation aids to which the ICT, the IoT technology, etc. have been applied.

SUMMARY

One aspect is a system for managing a multi-service for smart navigation aids based on microservice architecture, which can prevent interference between a main operating system (OS) and major services for smart navigation aids, which operate a plurality of sensors and services, and enables a stable and multi-purpose operation of equipment through microservice architecture.

Another aspect is a system for managing a multi-service for smart navigation aids based on microservice architecture according to an aspect of the present disclosure includes a smart navigation aid integrated platform, a main operating system (OS) that operates on the smart navigation aid integrated platform, a lightweight virtual OS manager based on a docker engine, which operates on the main OS, a plurality of lightweight virtual OSs that operate on a container basis by the lightweight virtual OS manager, and service applications that operate to correspond to the plurality of lightweight virtual OSs, respectively.

In some embodiments of the present disclosure, the service applications may be service applications that are present on independent containers in order to provide a sensor data streaming collection service, a local database service, a remote place data transfer service, a battery monitoring service, a computing resource monitoring service, a sensor failure diagnosis service, and a recovery service, respectively.

In some embodiments of the present disclosure, the sensor data streaming collection service may store collected sensor data in a local database that is managed by the local database service. The sensor data streaming collections may be divided and operated by a plurality of containers based on information on the number and characteristics of sensors included in smart navigation aids.

In some embodiments of the present disclosure, the sensor failure diagnosis service may query about data of a sensor provided in smart navigation aids, which are continuously loaded into a local database that is managed by the local database service, and may provide notification information when detecting a data pattern corresponding to a failure by analyzing a distribution of the data of the sensor.

In some embodiments of the present disclosure, the remote place data transfer service may transmit, to at least one of a central server and another vessel, data that have been loaded into a local database that is managed by the local database service by using a predetermined communication module.

In some embodiments of the present disclosure, the battery monitoring service may monitor a state of a battery for smart navigation aids by analyzing a pattern of data collected from a remaining battery power sensor for the smart navigation aids, and may provide notification information when detecting an abnormal pattern as results of the analysis of the pattern of the data.

In some embodiments of the present disclosure, the computing resource monitoring service may provide notification information when detecting a shortage of a computing resource or an abnormal pattern corresponding to smart navigation aids.

In some embodiments of the present disclosure, the recovery service may monitor all of a plurality of containers and transmits a re-execution command to a corresponding container when an abnormal pattern occurs or when it is determined that the corresponding container needs to be re-executed.

In addition, another method and another system for implementing the embodiments of the present disclosure and a computer-readable recording medium on which a computer program for executing the method may be further provided.

According to the embodiment of the present disclosure, a smart navigation aid service based on microservice architecture, which prevents another service and container from being influenced although an error of a system level occurs or the abnormal occupation of a resource is attempted for each service by assigning a guest OS to each of major services that constitute smart navigation aids, can be provided.

Furthermore, various services, which have not operated with the anxiety of the health of a system in the existing navigation aid, can operate simultaneously through services that need to operate in smart navigation aids and interfaces within microservice architecture, which are necessary between the services.

Effects of the present disclosure which may be obtained in the present disclosure are not limited to the aforementioned effects, and other effects not described above may be evidently understood by a person having ordinary knowledge in the art to which the present disclosure pertains from the following description.

DETAILED DESCRIPTION

Figure 1:
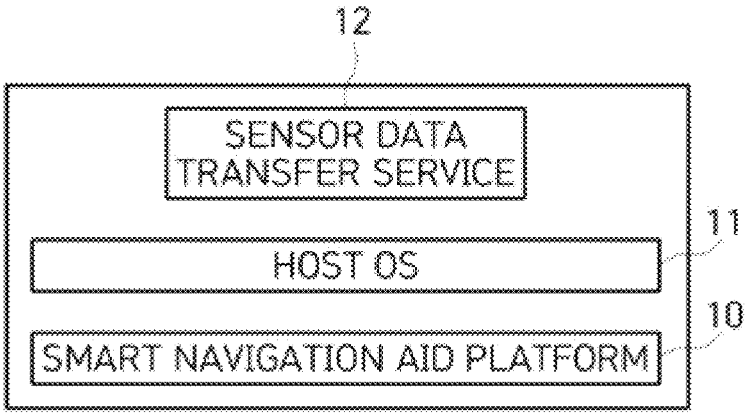
FIG. 1 is a diagram for describing a smart navigation aid service.

FIG. 1 is a diagram for describing a smart navigation aid service. All services and software that are necessary for the smart navigation aids need to always operate. In general, software services have the possibility that a severe error may occur due to the occupation of memory attributable to a memory leak or communication between a service and a process when the software services operate for a long term. Accordingly, in the existing smart navigation aids, there is a case in which only a sensor data transfer service 11, that is, a service having the highest priority in a smart navigation aid platform 10, operates or a general-purpose operating system (OS) 12 is not used with the anxiety of such a problem.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Embodiments of the present disclosure relate to a system for managing a multi-service for smart navigation aids based on microservice architecture (hereinafter referred to as a "smart navigation aid multi-service management system").

An embodiment of the present disclosure can improve a problem, such as the occupation of memory attributable to a memory leak in conventional smart navigation aid service or an error which occurs in communication, by using a Linux container scheme, that is, a virtualization guest operating system (OS).

In an embodiment of the present disclosure, applies Linux containers to smart navigational buoys, allocating independent containers to each service. Accordingly, the possibility that new services interfere with major services can be fully blocked because the containers do not mutually interfere with each other and do not affect even a host OS.

Figure 2A:
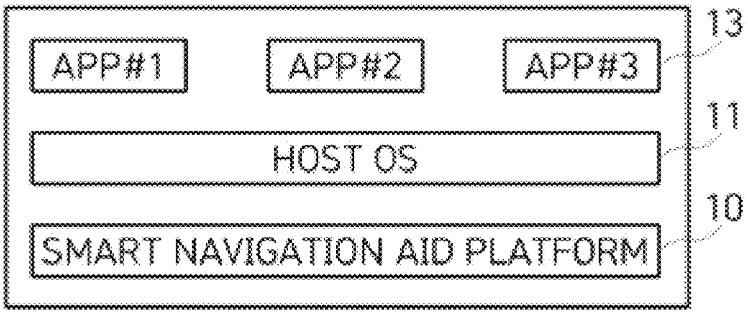
FIGS. 2A and 2B are diagrams illustrating operation environment structures according to a conventional technology and an embodiment of the present disclosure.
Figure 2B:
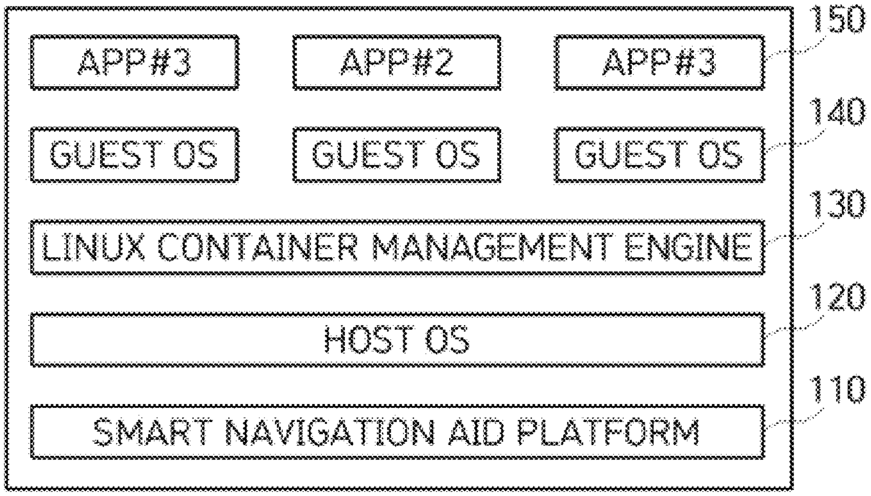

FIGS. 2A and 2B are diagrams illustrating operation environment structures according to a conventional technology (not necessarily prior art) and an embodiment of the present disclosure.

Architecture using a Linux container scheme as in an embodiment of the present disclosure is called microservice architecture, and architecture not using a Linux container scheme is called monolithic architecture.

A smart navigation aid platform 10 according to monolithic architecture as illustrated in FIG. 2A includes a host OS 11 and a plurality of applications (APPs) 13. Since all the processes of the smart navigation aid platform are closely combined and executed as a single service, the smart navigation aid platform can be easily developed and can provide a high availability environment, but is not suitable for providing multiple services due to difficulty in maintenance because the entire smart navigation aid platform has to be modified when a small change occurs.

In contrast, a smart navigation aid integrated platform 110 according to an embodiment of the present disclosure is constructed based on the microservice architecture as illustrated in FIG. 2B, and has an advantage in that each of applications can be normalized by modifying only a corresponding part when an error occurs because all the applications are constructed as independent components. Through the microservice architecture, interference between a main OS and major services of smart navigation aids that need to operate several sensors and services can be prevented. Accordingly, a stable and multi-purpose operation of equipment can be made possible.

Figure 3:
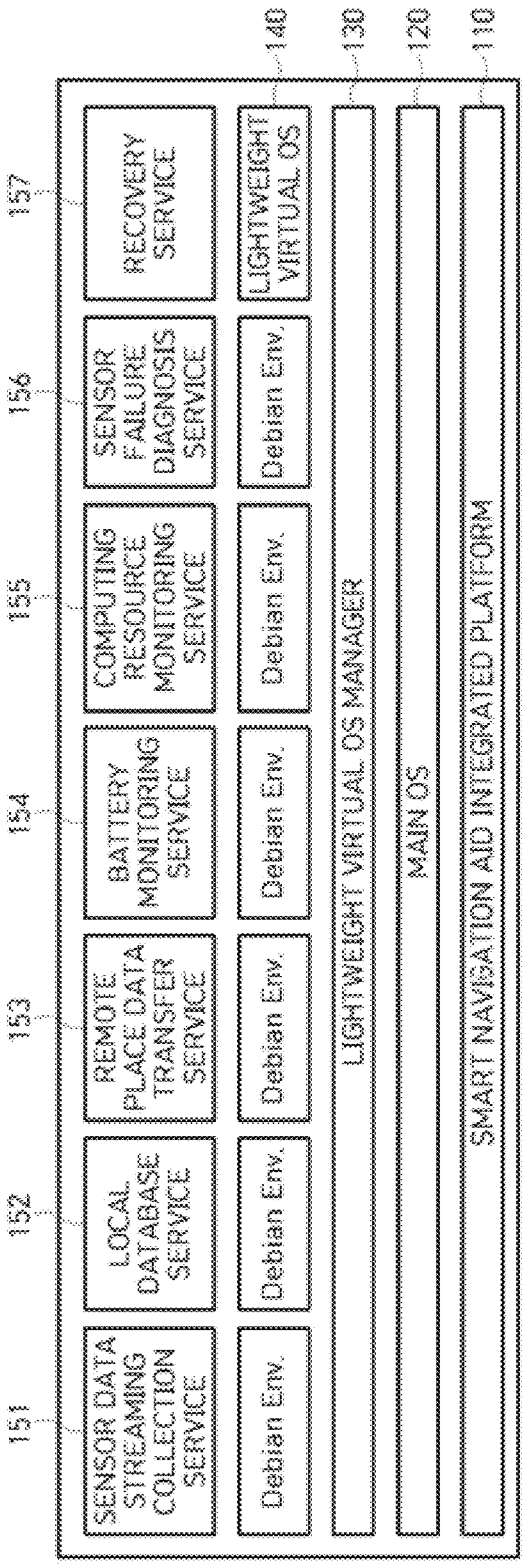
FIG. 3 is a block diagram of a system for managing a multi-service for smart navigation aids according to an embodiment of the present disclosure.

FIG. 3 is a block diagram of a smart navigation aid multi-service management system 100 according to an embodiment of the present disclosure.

The smart navigation aid multi-service management system 100 according to an embodiment of the present disclosure includes the smart navigation aid integrated platform 110, a main OS 120, a lightweight virtual OS manager (or a docker engine) 130, a lightweight virtual OS (Debian Env.) 140, and service applications 151 to 158.

The smart navigation aid integrated platform 110 corresponds to hardware for providing various services in smart navigation aids. The main OS 120 is installed in the smart navigation aid integrated platform 110 and operated thereon, and allows various services necessary for the smart navigation aids to operate on a docker-container basis.

The plurality of lightweight virtual OS managers 130 operates on a docker engine basis in the main OS 120, and manages the plurality of lightweight virtual OSs 140.

The plurality of lightweight virtual OSs 140 operates on a container basis by the lightweight virtual OS manager 130. The service applications 151 to 158 are constructed to correspond to the lightweight virtual OSs 140, respectively, and provide services.

The service applications 151 to 158 according to an embodiment of the present disclosure may be present on independent containers for each service in order to provide a sensor data streaming collection service 151, a local database service 152, a remote place data transfer service 153, a battery monitoring service 154, a computing resource monitoring service 155, a sensor failure diagnosis service 156, a recovery service 157, and a navigation aid standard protocol message service 158. That is, in an embodiment of the present disclosure, an isolated storage space and computing resource can be guaranteed by assigning one container to each service.

Smart navigation aids according to an embodiment of the present disclosure have such independent container structures. Accordingly, although a severe error in a system level occurs in at least one of the services, only a corresponding container is influenced. Such an error can be solved by re-executing a lightweight virtual OS, that is, a guest OS of the container. Furthermore, if a problem continues although a corresponding container is re-executed, a manager can solve the problem by checking a log of the corresponding container.

Furthermore, in an embodiment of the present disclosure, operations of other services are not hindered because only a resource assigned to a service can be occupied although the service attempts the excessive occupation of a computing resource (e.g., the occupation of a CPU or the occupation of main memory). For example, in the case of the sensor failure diagnosis service, a database query process and a machine learning process through parallel operations need to be repeatedly performed on continued data. When considering such characteristics of processing, the loading of a service may become a burden on a navigation aid manager on speculation that a high computational load and a storage space will be required. However, such a problem can be blocked by applying the independent container structures according to an embodiment of the present disclosure. Accordingly, the loading of a corresponding service can be determined.

Table 1 illustrates the results of the operations of services for 30 days according to an embodiment of the present disclosure. Each container has been assigned 1.5 times a maximum CPU share and the usage of main memory of each service. Accordingly, although the occupation of a resource is abnormally attempted by an abnormal pattern, the abnormal pattern cannot occupy more than the resource that has been assigned to each container. Furthermore, if the allocated resource is occupied 100%, measures, such as the re-execution of a corresponding container by the recovery service, may be taken.

TABLE 1

| | MAXIMUM CPU SHARE (%) | ALLOCATED CPU SHARE (%) | MAXIMUM MAIN MEMORY (MB) | ALLOCATED MAIN MEMORY (MB) |
|---|---|---|---|---|
| SENSOR DATA COLLECTION SERVICE | 3 | 4.5 | 200 | 300 |
| LOCAL DB | 12 | 18 | 500 | 750 |
| REMOTE TRANSFER SERVICE | 3 | 4.5 | 200 | 300 |
| BATTERY MONITORING SERVICE | 5 | 7.5 | 200 | 300 |
| COMPUTING RESOURCE DIAGNOSIS SERVICE | 7 | 10.5 | 400 | 600 |
| EMBEDDED SENSOR FAILURE DIAGNOSIS SERVICE | 10 | 15 | 400 | 600 |
| RECOVERY SERVICE | 6 | 9 | 200 | 300 |
| HOST OS AND OTHER SERVICES | 22 | 33 | 1200 | 1800 |
| SUM | 68 | 102 | 3300 | 4950 |

Detailed services that are performed in the smart navigation aid multi-service management system 100 according to an embodiment of the present disclosure are described below.

Figure 4:
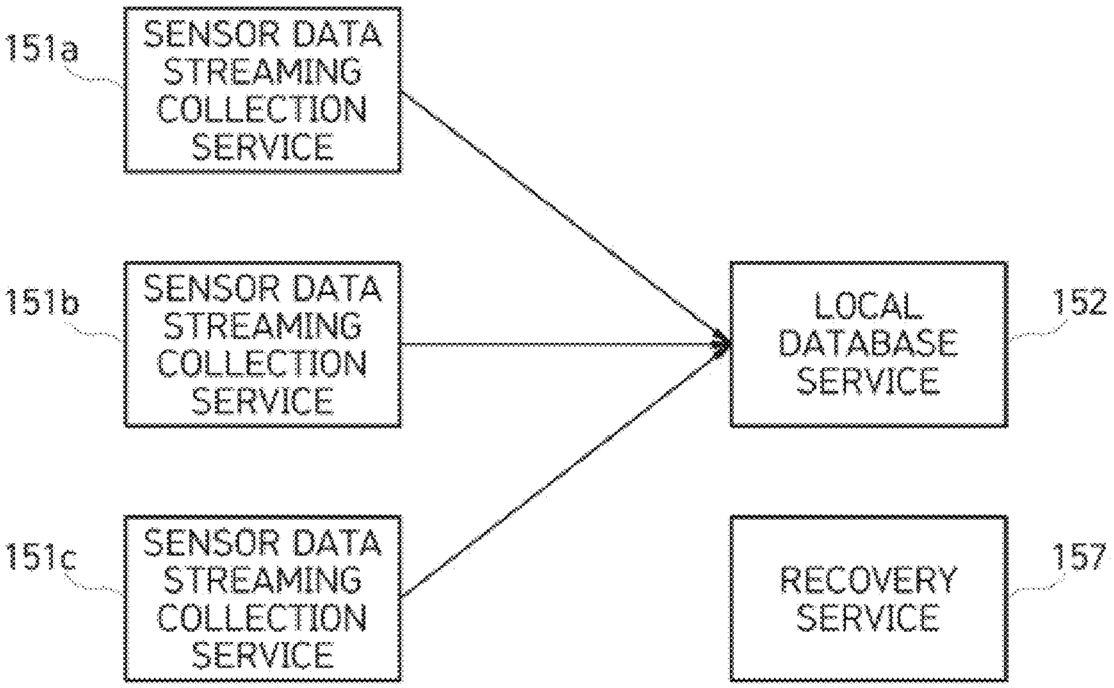
FIG. 4 is a diagram for describing a sensor data streaming collection service according to an embodiment of the present disclosure.

FIG. 4 is a diagram for describing the sensor data streaming collection service according to an embodiment of the present disclosure.

As an embodiment, the sensor data streaming collection service 151 stores collected sensor data in a local database that is managed by the local database service 152. In this case, a message protocol for transmitting the collected data to the local database that is managed by the local database service 152 may use APIs that are supported by each local database 152 or a subscription message system, such as message queuing telemetry transport (MQTT).

Sensor data streaming collection services 151*a* to 153*c* may be divided and operated by a plurality of containers based on information on the number and characteristics of sensors that are included in smart navigation aids.

The local database service 152 may be provided by implementing the local database by using open sources, such as MongoDB and Influx DB. The local database that is managed by the local database service 152 may be set so that the local database cannot store data for a long period of time in view of characteristics of a navigation aid having a limited storage space.

Figure 5:
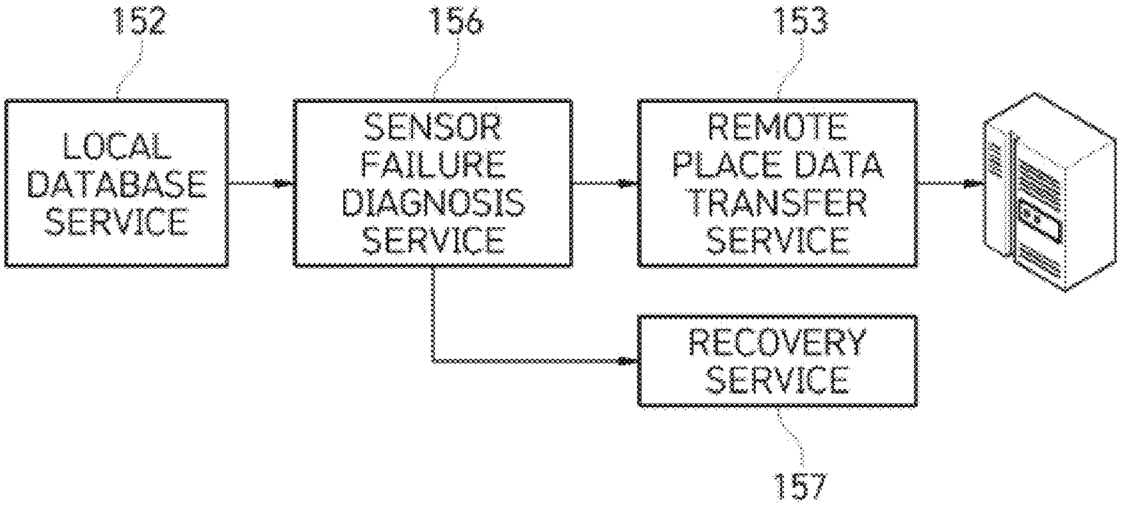
FIG. 5 is a diagram for describing a sensor failure diagnosis service according to an embodiment of the present disclosure.

FIG. 5 is a diagram for describing the sensor failure diagnosis service according to an embodiment of the present disclosure.

As an embodiment, the sensor failure diagnosis service 156 continuously queries about sensor data that are loaded into the local database. Furthermore, the sensor failure diagnosis service 156 analyzes a distribution of the data of a sensor included in smart navigation aids, and may provide notification information to a manager when detecting a data pattern that is determined to be a failure as the results of the analysis.

Figure 6:
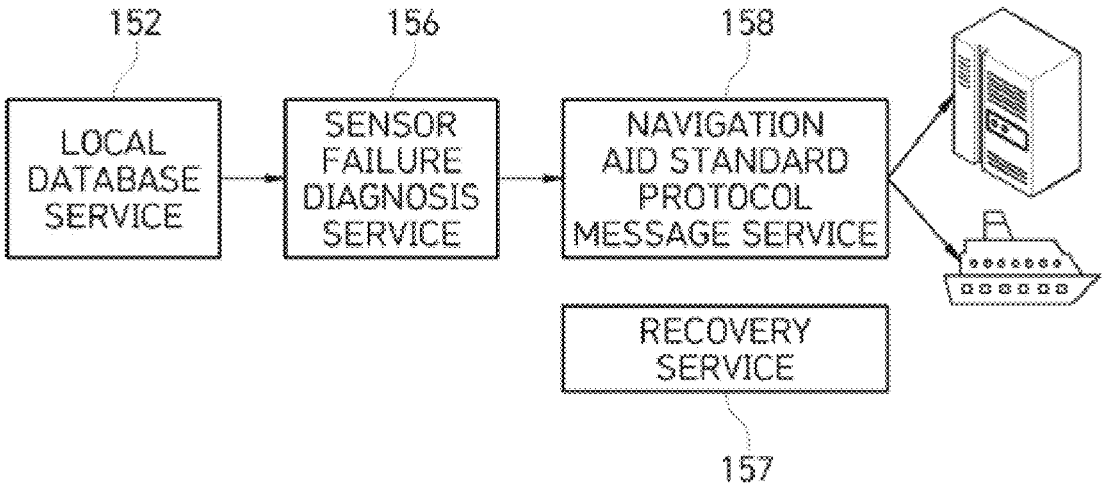
FIG. 6 is a diagram for describing a remote place data transfer service according to an embodiment of the present disclosure.

FIG. 6 is a diagram for describing the remote place data transfer service according to an embodiment of the present disclosure.

As an embodiment, the remote place data transfer service 153 is a service that transmits, to a central server or another vessel, data that have been loaded into the local database that is managed by the local database service 152 by using a predetermined communication module.

In this case, the communication module that is used in the remote place data transfer service 153 may be a sea-dedicated module, such as AIS, NB-IOT, or LTE-M. The communication module may reconstruct a transmission message suitably for the protocol of each communication module, and may transmit the reconstructed transmission message to a reception entity.

In addition, since the state of a battery for smart navigation aids is the most important data, the battery monitoring service 154 may monitor the state of the battery for the smart navigation aids by analyzing a pattern of data collected from the remaining battery power sensor for the smart navigation aids. Furthermore, when detecting an abnormal pattern as the results of the analysis of the pattern of the data, the battery monitoring service 154 may provide notification information to a manager.

As an embodiment, the computing resource monitoring service 155 may provide notification information to a manager when detecting the shortage of a computing resource or an abnormal pattern corresponding to smart navigation aids.

Figure 7:
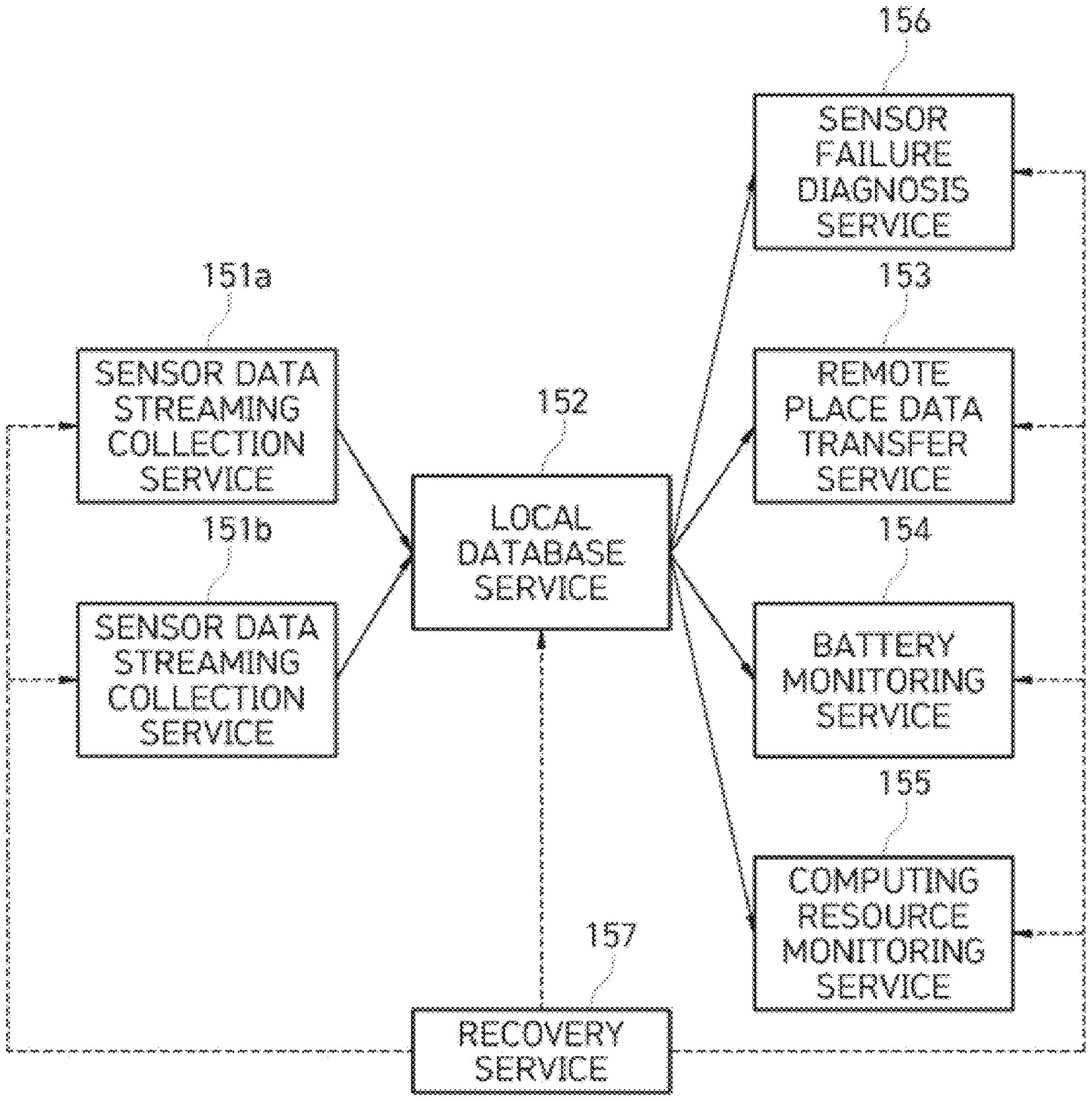
FIG. 7 is a diagram for describing a recovery service according to an embodiment of the present disclosure.

FIG. 7 is a diagram for describing the recovery service according to an embodiment of the present disclosure.

As an embodiment, the recovery service 157 monitors all of the plurality of containers, and may transmit a re-execution command to a corresponding container when an abnormal pattern occurs or the corresponding container needs to be re-executed.

In an embodiment of the present disclosure, the docker container that is basically used as a Linux container management engine supports open SDK. Accordingly, an application service that automatically manages containers can be developed by using the Linux container management engine.

Figure 8:
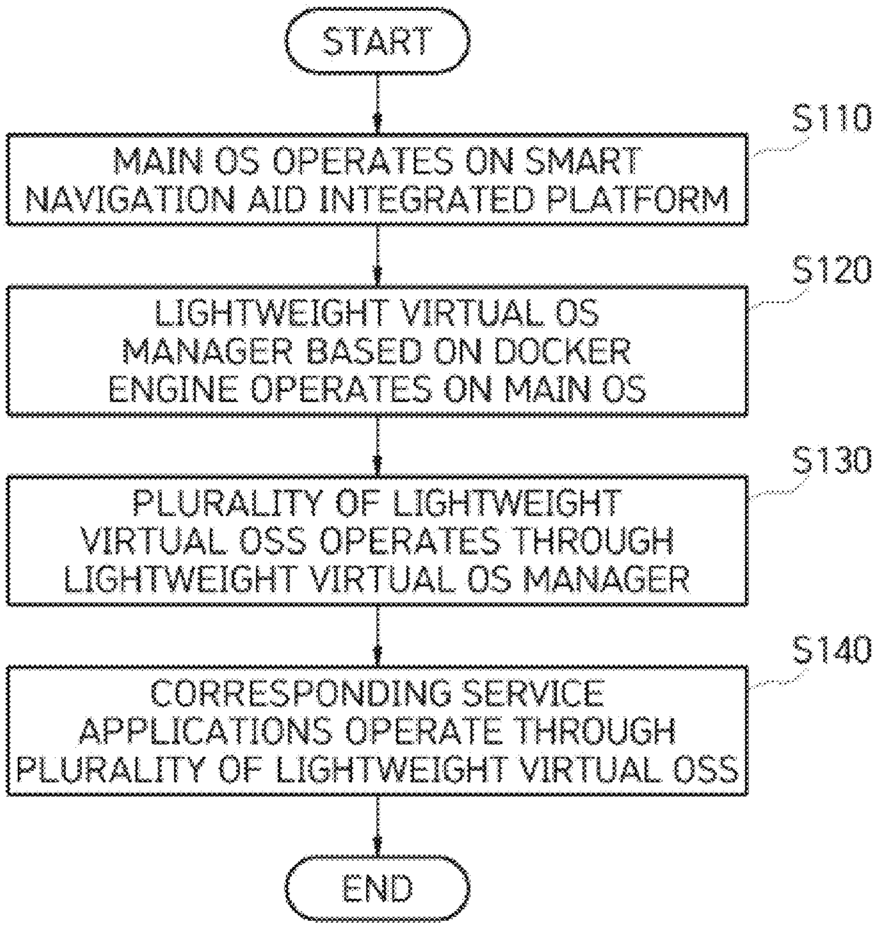
FIG. 8 is a flowchart of a method of providing a multi-service for smart navigation aids based on microservice architecture according to an embodiment of the present disclosure.

FIG. 8 is a flowchart of a method of providing a multi-service for smart navigation aids based on microservice architecture according to an embodiment of the present disclosure. It may be understood that steps illustrated in FIG. 8 are executed by the smart navigation aid multi-service management system illustrated in FIGS. 2B to 7.

First, the main OS operates on the smart navigation aid integrated platform (S110).

Next, the lightweight virtual OS manager based on the docker engine operates on the main OS (S120).

Next, the plurality of lightweight virtual OSs that operate on a container basis operate through the lightweight virtual OS manager (S130).

Next, corresponding service applications operate through the plurality of lightweight virtual OSs, respectively (S140).

In the aforementioned description, steps S110 to S140 may be further divided into additional steps or may be combined into smaller steps depending on an implementation example of the present disclosure. Furthermore, some of steps S110 to S140 may be omitted, if necessary, and the sequence of steps S110 to S140 may be changed. Furthermore, although contents are omitted, the contents described with reference to FIGS. 2B to 3 to 7 may also be applied to the method in FIG. 8.

The smart navigation aid multi-service management system 100 according to the embodiment of the present disclosure may be implemented in the form of a program (or application) in order to be executed by being combined with a server, that is, hardware, and may be stored in a medium.

The aforementioned program may include a code coded in a computer language, such as C, C++, JAVA, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and is readable by a device, not a medium storing data for a short moment like a register, a cache, or memory. Specifically, examples of the stored medium include ROM, RAM, CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The steps of the method or algorithm described in relation to the embodiments of the present disclosure may be directly implemented as hardware, may be implemented as a software module executed by hardware, or may be implemented by a combination of them. The software module may reside in random access memory (RAM), read only memory (ROM), erasable programmable ROM (EPROM), electrically erasable programmable ROM (EEPROM), flash memory, a hard disk, a detachable disk, CD-ROM, or a computer-readable medium having a given form, which is well known in the field to which the present disclosure pertains.

Although the embodiments of the present disclosure have been described with reference to the accompanying drawings, a person of ordinary knowledge in the art to which the present disclosure pertains may understand that the present disclosure may be implemented in other detailed forms without changing the technical spirit or essential characteristics of the present disclosure. Accordingly, it is to be understood that the aforementioned embodiments are only illustrative, but are not limitative in all aspects.

What is claimed is:

1. A system for managing a multi-service for smart navigation aids based on microservice architecture, the system comprising:

at least one processor;

a communication module configured to communicate with a vessel and one or more smart navigation aids placed in a port, a bay, a strait, inland waters, or territorial waters, each of the one or more smart navigation aids comprising at least one sensor;

a smart navigation aid integrated platform, and a memory storing a program comprising modules that comprise the smart navigation aid integrated platform, a main operating system (OS), a lightweight virtual OS manager, a plurality of lightweight virtual Oss, and service applications, wherein the at least one processor is configured to execute the program to:

operate the main operating system (OS) on the smart navigation aid integrated platform;

operate the lightweight virtual OS manager based on a docker engine on the main OS;

operate the plurality of lightweight virtual OSs on a container basis by the lightweight virtual OS manager; and operate the service applications on the plurality of lightweight virtual OSs, respectively, the service applications comprising a sensor data streaming collection service, a local database service, and a remote place data transfer service, wherein the at least one processor is configured to execute the program further to:

operate the sensor data streaming collection service to collect sensor data from a sensor in one of the one or more smart navigation aids and to store the collected sensor data in a local database, operate the local database service to set the local database not to store the collected sensor data beyond a predetermined period of time in view of characteristics of the one or more smart navigation aids, and operate the remote place data transfer service to transmit to the vessel the sensor data stored in the local database that is managed by the local database service using the communication module.

2. The system of claim 1, wherein the service applications are configured to be present on independent containers in order to provide the sensor data streaming collection service, the local database service, the remote place data transfer service, a battery monitoring service, a computing resource monitoring service, a sensor failure diagnosis service, and a recovery service, respectively.

3. The system of claim 2, wherein:

the sensor data streaming collection service is configured to store collected sensor data in a local database that is managed by the local database service, and the sensor data streaming collections are configured to be divided and operated by a plurality of containers based on information on a number and characteristics of the sensors included in the one or more smart navigation aids.

4. The system of claim 2, wherein the sensor failure diagnosis service is configured to query about data of the sensors provided in the one or more smart navigation aids, which are continuously loaded into the local database that is managed by the local database service, and provide notification information in response to detecting a data pattern corresponding to a failure by analyzing a distribution of the data of the sensor.

5. The system of claim 2, wherein the battery monitoring service is configured to:

monitor a state of a battery for each of the one or more smart navigation aids by analyzing a pattern of data collected from a remaining battery power sensor for each of the one or more smart navigation aids, and provide notification information in response to detecting an abnormal pattern as a result of the analysis of the pattern of the data.

6. The system of claim 2, wherein the computing resource monitoring service is configured to provide notification information in response to detecting a shortage of a computing resource or an abnormal pattern corresponding to one of the one or more smart navigation aids.

7. The system of claim 2, wherein the recovery service is configured to monitor all of a plurality of containers and transmit a re-execution command to a corresponding container in response to occurrence of an abnormal pattern or in response to determining that the corresponding container needs to be re-executed.

8. A method of providing a multi-service for smart navigation aids based on microservice architecture, the method comprising:

operating a main operating system (OS) on a smart navigation aid integrated platform;

operating, on the main OS, a lightweight virtual OS manager based on a docker engine;

operating a plurality of lightweight virtual OSs that operate on a container basis through the lightweight virtual OS manager; and operating corresponding service applications through the plurality of lightweight virtual OSs, respectively, the service applications comprising a sensor data streaming collection service, a local database service, and a remote place data transfer service, wherein operating corresponding service applications comprises:

operating the sensor data streaming collection service to collect sensor data from a sensor in one of one or more smart navigation aids and to store the collected sensor data in a local database, operating the local database service to set the local database not to store the collected sensor data beyond a predetermined period of time in view of characteristics of the one or more smart navigation aids, and operating the remote place data transfer service to transmit to a vessel, the sensor data stored in the local database that is managed by the local database service using a communication module.

9. The method of claim 8, wherein operating the corresponding service applications comprises:

operating the service applications that are present on independent containers in order to provide the sensor data streaming collection service, the local database service, the remote place data transfer service, a battery monitoring service, a computing resource monitoring service, a sensor failure diagnosis service, and a recovery service, respectively.

10. The method of claim 9, wherein operating the corresponding service applications comprises:

operating the sensor data streaming collection service for storing collected sensor data in a local database that is managed by the local database service, and dividing and operating the sensor data streaming collections by a plurality of containers based on information on a number and characteristics of the sensors included in the one or more smart navigation aids.

11. The method of claim 9, wherein operating the corresponding service applications comprises:

performing the sensor failure diagnosis service for querying about data of the sensors provided in the one or more smart navigation aids, which are continuously loaded into the local database that is managed by the local database service, and providing notification information in response to detecting a data pattern corresponding to a failure by analyzing a distribution of the data of the sensor.

12. The method of claim 9, wherein operating the corresponding service applications comprises:

performing the battery monitoring service for monitoring a state of a battery for each of the one or more smart navigation aids by analyzing a pattern of data collected from a remaining battery power sensor for each of the one or more smart navigation aids, and providing notification information in response to detecting an abnormal pattern as a result of the analysis of the pattern of the data.

* * * * *